(No Model.)
I. METZGER.
JOURNAL AND BOXING AND BEARING THEREFOR.
No. 509,178. Patented Nov. 21, 1893.
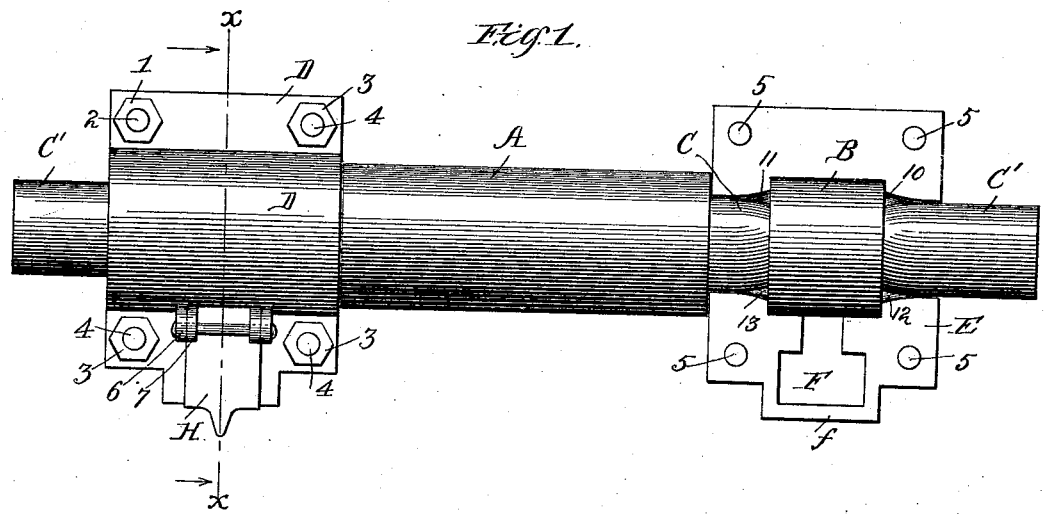
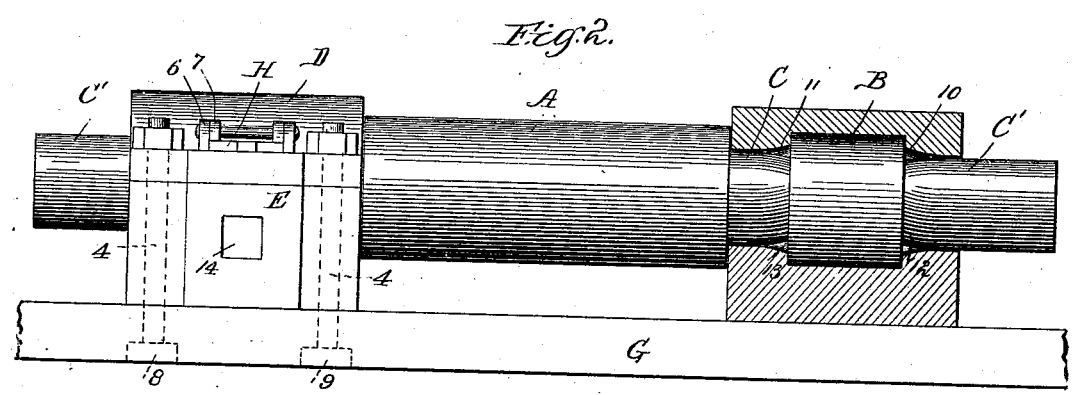
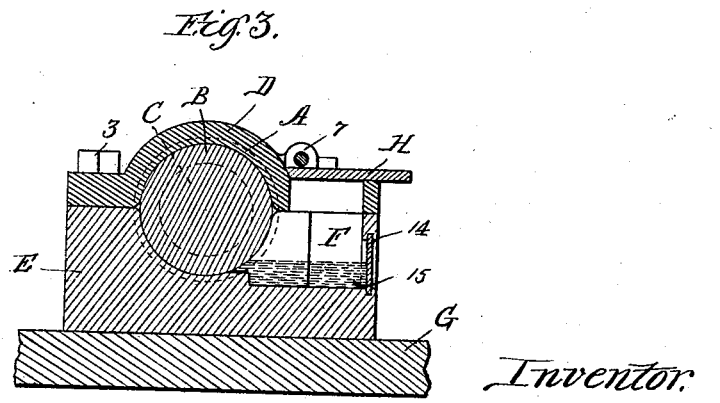
Witnesses.
Inventor.
Isbon Metzger
By Benton J. Stall
Atty.

UNITED STATES PATENT OFFICE.

ISBON METZGER, OF NEAR WINFIELD, IOWA.

JOURNAL AND BOXING AND BEARING THEREFOR.

SPECIFICATION forming part of Letters Patent No. 509,178, dated November 21, 1893.

Application filed April 15, 1893. Serial No. 470,441. (No model.)

*To all whom it may concern:*

Be it known that I, ISBON METZGER, a citizen of the United States, residing near Winfield, in the county of Louisa and State of Iowa, have invented new and useful Improvements in Journals and Boxings and Bearings Therefor, of which the following is a specification.

My invention relates to improvements in journals and the bearings therefor of shafting, railroad axles and other similar kinds of machinery.

Its objects are, to provide a journal of a peculiar construction, to which is adapted an appropriate bearing or boxing, to prevent the introduction of dust or sand, and to provide automatic lubrication, without the employment of wicking, or other material, to absorbe the lubricating material and hold it against the revolving journal, whereby the waste and loss, rendered necessary by the employment of such means is fully obviated. I attain these objects, by means of the mechanism shown and illustrated in the accompanying drawings, in which like reference letters, and numerals refer to like parts throughout.

Figure 1 represents a piece of shafting, with its journals in place; one of the bearings or boxes presenting a top plan view, and the other presenting a top plan view of the lower section of the bearing or boxing, the top being removed. Fig. 2 represents a side elevation of Fig. 1, except that one of the bearings or boxings and part of the journal held therein, is illustrated by a vertical longitudinal section thereof. Fig. 3 is a vertical transverse sectional view of my invention, upon the line $x\ x$ Fig. 1.

A, C, C' represent a piece of shafting, constructed according to the plan of my invention. It is provided with a journal B, for each and every bearing required to support it. This journal may be made integral with the smaller portion of the shafting C. C', or it may be made in the shape of a collar and permanently located thereon, by any of the well known means for affixing collars upon shafts. I prefer that the parts of the smaller portions of the shafting C, C' shall be slightly beveled at 12 and 13, immediately adjacent the opposite sides of the journal B. The main body of the shaft A is made of slightly greater diameter, than the diameter of the journal B, so that pulleys or wheels, which are to be secured upon it, can pass over the journal B.

The letters D and E represent the upper and lower sections of the bearing or boxing, which are held firmly together, when in place, by the bolts 2, 4, 4, 4, and the nuts 1, 3, 3, 3. The upper and lower sections of the bearing or boxing are provided with circular recesses, practically corresponding to the diameter of the journal B, but the bores of the boxing out of which the smaller sections of the shafting, C, C' pass, are slightly larger than the diameter of those sections, so that there is no friction between those sections and the interior walls of the bores. The inner portions of these several bores, are slightly beveled, as shown by Figs. 10 and 11. In the lower section of each of the bearings or boxing is cut an oil well F, which extends below the lower periphery of the journal B, as shown in Fig. 3. A corresponding opening is cut through the upper section D, which is provided with a hinge cap or cover H, which may be held in place by any well known means. I have illustrated the hinges as constructed of lugs 7, attached to the upper section D and lugs 6 attached to the cap or cover, and held in place by the bolt. The oil is admitted into the bearing or boxing through the opening or oil well F, and only enough oil is supplied at any one time to fill the well nearly up to the lower periphery of the smaller section C, C' of the shafting. The object of thus limiting the quantity of oil is to prevent the possibility of its flowing out, through the spaces between the small sections of the shafting C, and C' and the bores of the boxing. The purpose of beveling the inner parts of the bores of the boxing as shown at 10 and 11, and those sides of the smaller sections C, C' which are adjacent to the journal B, is to cause any portion of the oil, which may be scattered or pressed outwardly by the revolution of the journal B, to flow back down into the recess in which the journal B is located.

In order to enable the operator to determine when a sufficient quantity of oil has been introduced, an opening 14 may be made in one of the walls of the bearing or boxing, in which glass is inserted.

Having thus described the construction of my invention, it is evident that its mode of operation is very simple.

The operator opens the door or cap of the oil well F and introduces the required quantity of lubricating material. This of course, may be done while the machinery is in operation, or while it is still. As already explained, it is important that the surface of the oil or lubricating material shall not rise up sufficiently to flow out through the bore in which is located the smaller section of the axle, C. The enlarged journal B is immersed in the lubricating material, and in its revolutions carries it around between its surface and the surface of the bearing. There being no passage for or means of leakage, the oil remains until consumed or the quantity is so far reduced, that it no longer is in contact with the journal. The oil well F as shown in Fig. 3 extends somewhat below the lower periphery of the journal. The object of this is to permit any dust, grit, or wearings of the journal and bearings to fall and settle down into this lower portion of the oil-well, and prevent it from entering between the journal and its bearing.

It is evident that there may be many changes, variations and modifications, in the details of construction and the arrangement of parts of my said invention.

Instead of locating the well hole F upon one side of the journal B as shown in Fig. 1, the extension f may be located on the end of the boxing, opposite the end of the journal B, and the well hole F, cut down so as to extend longitudinally beneath the journal B. I therefore, do not limit myself to the exact details of construction and arrangement shown.

Having thus described my invention and its mode of operation, what I claim, and desire to secure by Letters Patent of the United States, is as follows:

1. A shafting provided with an enlarged projection or collar for a bearing, the extensions of the sections of said shafting, on each side of said journal being beveled or slightly reduced in diameter at points adjacent to the sides of said journal, in combination with a boxing constructed of two sections, the upper and lower section respectively provided with circular recesses, conforming to the diameter of said journal; the inner portions of the bores of said boxing, through which the smaller sections of the shafting pass, being inwardly beveled; an oil well cut through both of said sections and extending down into the lower section to a point at and below the lower periphery of said journal; a cap or cover for said oil well; and means for holding said upper and lower sections of the boxing firmly and rigidly together; all substantially as shown.

2. A shafting provided with an enlarged projection or collar for a journal, the immediate extensions on each side thereof, being of a smaller diameter than said journal, and the main body of said shafting being of a diameter greater than that of said journal, all substantially as shown.

3. A bearing or boxing constructed in two sections, the upper and lower sections respectively being provided with a deep circular recess to conform to the diameter of the journal, and having a bore for the extension of the shafting of the smaller diameter than that of the said recesses; an oil well cut through the upper section and extending down through the lower section, with a space leading to the lower periphery of the recess in the lower section, said oil well being recessed deeper than the bottom of said space leading to said lower periphery, so as to receive and hold any wearings or grit or sand; a cap or cover for said oil well and means for holding said upper and lower sections firmly and rigidly together, all substantially as shown.

ISBON METZGER.

Witnesses:
BENTON J. HALL,
NELLY M. HARRIS.